United States Patent [19]
De Shores

[11] 3,921,583
[45] Nov. 25, 1975

[54] MODULAR AQUARIUM SYSTEM
[76] Inventor: Robert E. De Shores, 3476 Barbara St., San Pedro, Calif. 90731
[22] Filed: Apr. 19, 1974
[21] Appl. No.: 462,315

Related U.S. Application Data
[63] Continuation-in-part of Ser. No. 307,431, Nov. 17, 1972, abandoned.

[52] U.S. Cl. ............................ 119/5; 285/DIG. 12
[51] Int. Cl.² ................................... A01K 64/00
[58] Field of Search ............. 119/3, 5; 285/DIG. 12

[56] References Cited
UNITED STATES PATENTS

| | | | |
|---|---|---|---|
| 796,118 | 8/1905 | Duryea | 119/5 |
| 2,233,564 | 3/1941 | West | 119/5 X |
| 3,255,731 | 6/1966 | Girard | 119/5 X |
| 3,438,356 | 4/1969 | Claff | 119/5 X |
| D84,002 | 4/1931 | Smith | 119/5 X |

FOREIGN PATENTS OR APPLICATIONS

| 216,173 | 5/1924 | United Kingdom | 119/5 |
|---|---|---|---|

Primary Examiner—J. N. Esrovitz
Attorney, Agent, or Firm—Harlan P. Huebner

[57] ABSTRACT

An aquarium arrangement in which at least two aquarium tanks in a spaced relationship are interconnected by one or more tubes and means for connecting the tubes to the tanks.

5 Claims, 9 Drawing Figures

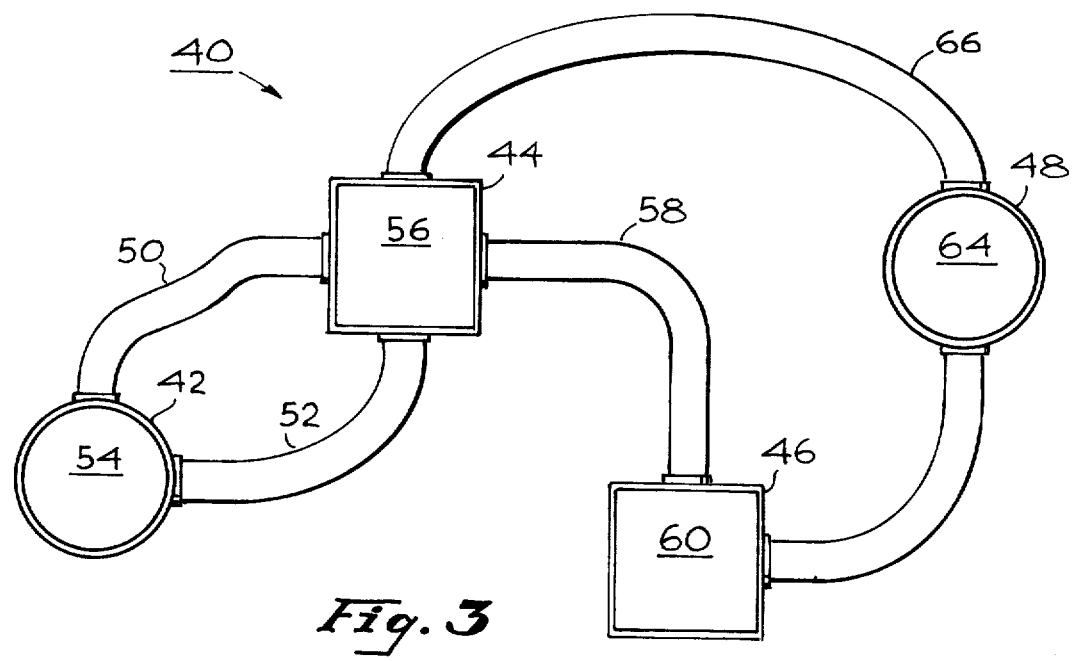
Fig. 3
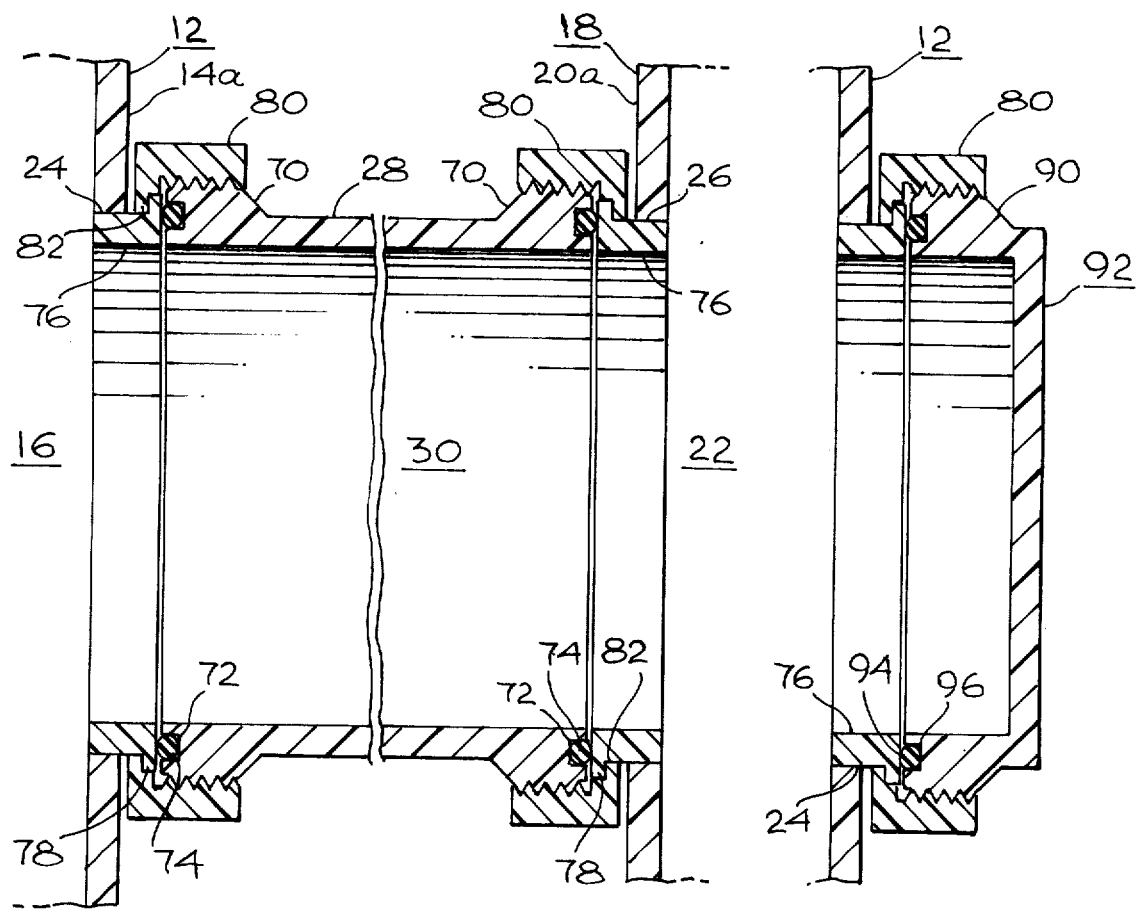
Fig. 4
Fig. 5

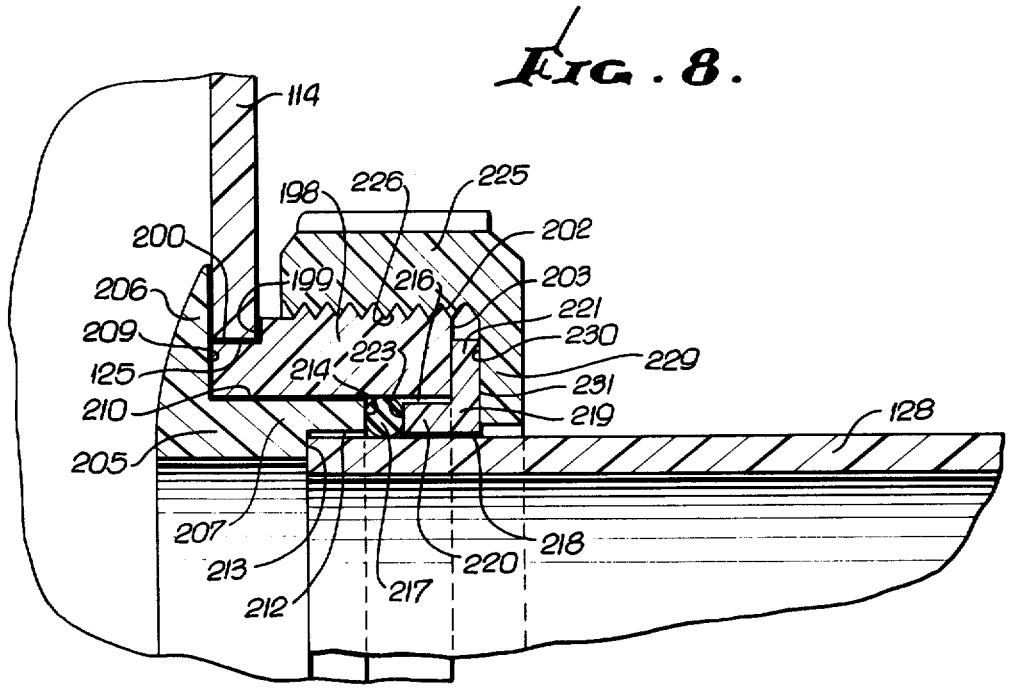
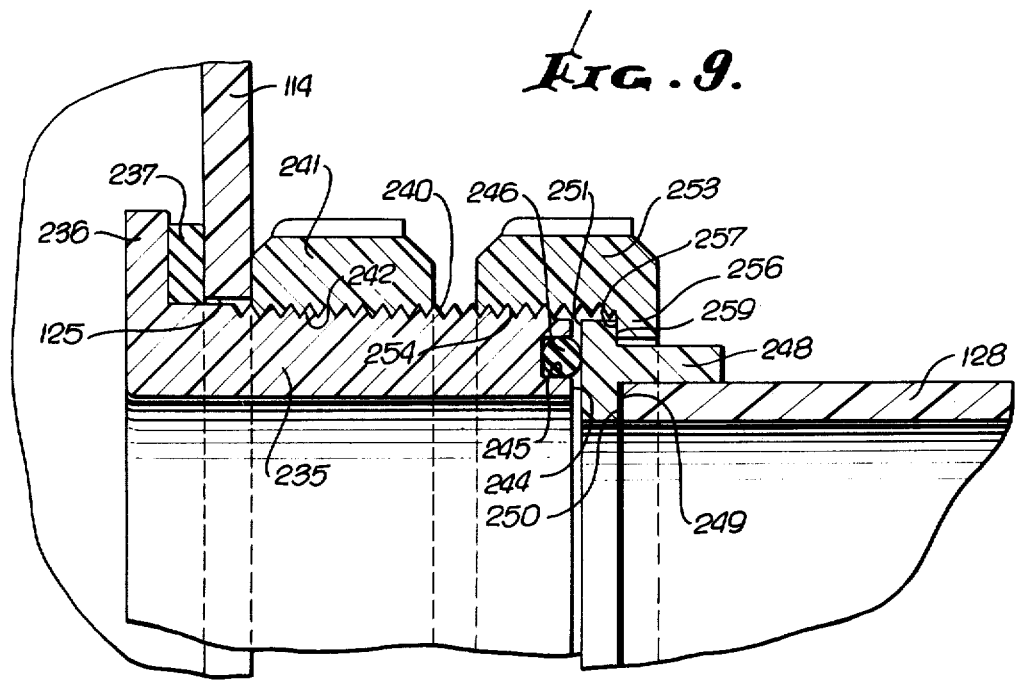

3,921,583

1

MODULAR AQUARIUM SYSTEM

CROSS-REFERENCE TO RELATED APPLICATION

This is a continuation-in-part of application Ser. No. 307,431, filed Nov. 17, 1972, now abandoned.

BACKGROUND OF THE INVENTION

This invention relates to an improved multi-tank aquarium system and means for connecting the tanks including sealing means.

Most prior art aquariums utilized by fish fanciers, pet shops, fish breeders, or the like, have generally been limited to a single tank or structurally unitary configuration. While many various sizes and shapes of aquarium tanks have heretofore been available, there has generally not been provided a structural arrangement allowing quick and rapid expansion in the size of the aquarium tank. That is, when it was desired to increase the size of the aquarium tank because of an increase in the number of fish to be contained therein, for example, it was necessary to purchase a separate, larger tank and generally discontinue the use of the smaller tank. Alternatively, of course, additional tanks could be purchased and the fish divided between the tanks as desired.

The former technique of merely purchasing a larger tank resulted in economic waste because the smaller tank would generally not thereafter be utilized. Purchasing additional small tanks for separately containing the fish did not often provide the desired aesthetic effect of a single larger aquarium tank.

SUMMARY OF THE INVENTION

Accordingly, it is an object of the present invention to provide an improved aquarium tank arrangement.

It is another object of the present invention to provide an improved aquarium tank arrangement that allows rapid and easy increase in the size of the aquarium tank arrangement without discarding previously used elements.

It is yet another object of the present invention to provide an improved aquarium tank arrangement that has an exceptionally pleasant visual aesthetic appearance.

The above and other objects of the present invention are achieved, in preferred embodiment thereof, by providing a first transparent, water tight tank means and a second transparent, water tight tank means. Each of the tank means may be in any desired geometrical shape and each of them have walls defining a water storage volume. As illustrated, the tank means are open at the top, and if covered a port should be provided so they are always open to the atmosphere. At least one transparent tube means having walls defining a passageway therethrough extends between the first and the second tanks and the passageway of the tube means communicates with the water storage volumes of the first and second tank means. Coupling means are also provided for joining the tube means to each of the tank means in a water tight sealing relationship that, in the preferred embodiment of the present invention, is also a detachable water tight sealing engagement therebetween.

When the tanks are utilized as an aquarium the water in each of the tanks is in communication through the passageway of the tube means and thus the fish may swim from one tank to another tank through the passageway in the tube means. This provides a highly pleasing visual aesthetic appearance through the aquarium arrangement according to the present invention.

In another embodiment of the present invention a plurality of tank means is in spaced relationship to each other and transparent tube means are utilized for interconnection in any desired array between the tank means. Each of the tank means may have one or more apertures extending through the walls thereof to provide the communication between the water storage volume in each tank means and the passageway of the tube means.

Where there is an aperture in one of the tank means that is not utilized for connection to a tube means, a special plug means is detachably coupled thereto to provide a water tight sealing relationship therewith. Thus, fish may swim from tank to tank through the various passageways of the tube means.

Further, if it is desired to increase the size of the aquarium it is only necessary to add an additional tank or tanks and additional tubes to any one of the previous tanks. Because of the detachable coupling utilized in the preferred embodiments of the present invention between the tube means and the tank means such connections may be rapidly and easily accomplished.

BRIEF DESCRIPTION OF THE DRAWINGS

The above and other embodiments of the present invention may be more fully understood from the following detailed description taken together with the accompanying drawings wherein similar reference characters refer to similar elements throughout and in which:

FIG. 3 is a plan view of another embodiment of the present invention;

FIG. 4 is a sectional view illustrating a tube means and a detachable coupling means useful in the practice of the present invention;

FIG. 5 is a sectional view illustrating a plug means useful in the practice of the present invention;

FIG. 8 is a fragmentary sectional view of a third type of coupling and sealing means; and FIG. 9 is a fragmentary sectional view of a fourth type of coupling and sealing means, including the means shown in FIG. 7.

DESCRIPTION OF THE PREFERRED EMBODIMENTS

Figure 1:
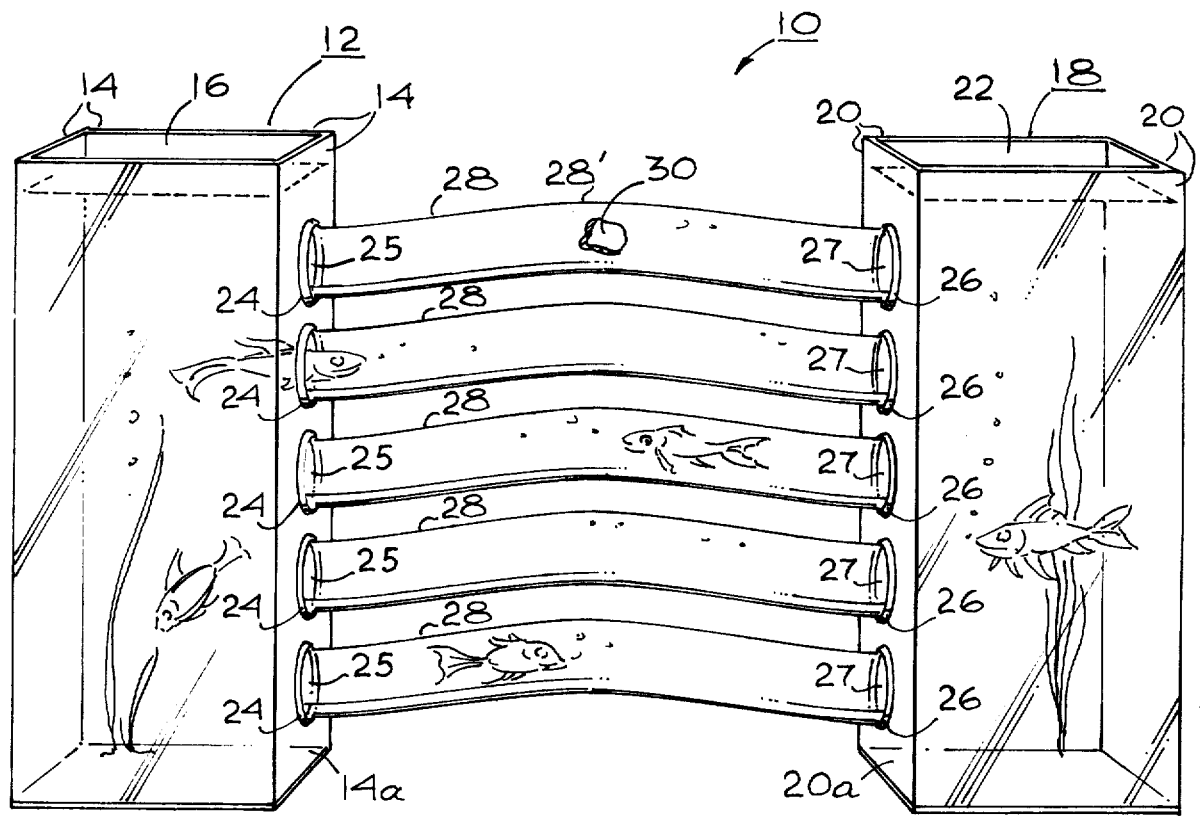
FIG. 1 is a perspective view of one embodiment of the present invention.

Referring now to FIG. 1 there is shown one embodiment, generally designated 10, of the present invention. In the embodiment 10 there is provided a first transparent water tight tank means 12 having walls 14 defining a water storage volume 16. The first transparent water tight tank means 12 has a preselected geometric shape which, in the embodiment 10, is a rectangular parallelpiped. It will be appreciated, however, that any of the tanks utilized in the present invention may have any desired geometrical shape such as cubic, hyper-hemispheric, cylindrical, prismatic, or the like.

A second transparent water tight tanks means 18 is spaced from the first water tight tank means 12 and also has walls 20 defining a water storage volume 22. The walls 14a and 20a of the first and second tank means 12 and 18, respectively, are provided with a plurality of aperture defining edges 24 and 26, respectively, defining apertures 25 and 27, respectively, extending therethrough to provide communication between the water storage volumes 16 and 22 and regions external thereof. While the apertures 25 and 27 are illustrated in FIG. 1 as being in a colinear array on the faces 14a and 20a, respectively, it will be appreciated that any desired spaced apart array of the apertures may be utilized as desired.

A plurality of substantially identical transparent tube means 28 extend between the first tank 12 and second tank 18 and each of the transparent tube means 28 has walls defining an internal passageway 30 therethrough. The passageway 30 in each of the tubes 28 communicates with the water storage volumes 16 and 22 through the apertures 25 and 27 defined by the edges 24 and 26.

Thus, the embodiment 10 allows convenient expansion of, for example, the first tank 12 to the second tank 18. That is, if first tank 12 has too many fish therein for its size, the second tank 18 may be quickly and conveniently attached by the tube means 28 thereto.

In preferred embodiments of the present invention the tube means 28 are detachably coupled to each of the tank means. This allows not only quick and convenient installation of additional tanks but also allows such tubes to be removed for periodic cleaning and maintenance. The details of a preferred embodiment of the detachable coupling is illustrated in FIG. 4 and described below. Utilization of the tubes 28 between the tanks 12 and 18 provides a pleasing visual aesthetic effect as the fish contained within the aquarium arrangement 10 may swim between the tanks 12 and 18 through the passageways 30 in the tubes 28. As illustrated in FIG. 1 the tubes 28 have at least a portion 28' that is arcuate. The entire tube 28 may be linear, arcuate, or formed in any other desired configuration. Further, the cross sectional configuration of the tubes 28 may be circular, square, eliptical, rectangular, or any other desired cross sectional shape.

Figure 2:
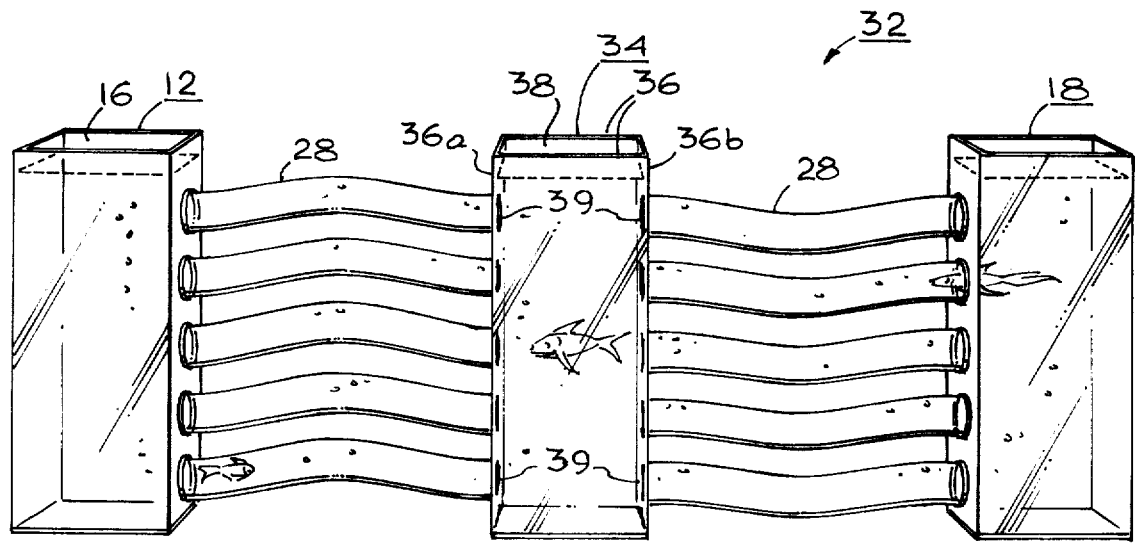
FIG. 2 is a perspective view of another embodiment of the present invention.

FIG. 2 illustrates another embodiment of the present invention, generally designated 32 which, in general, is similar to the embodiment 10 described above. That is, first tank 12 and a second tank 18 are provided in a spaced apart relationship. However, in the embodiment 32 there is provided a third transparent, water tight tank means 34 having walls 36 defining a water storage volume 38. The walls 36a and 36b of the tank means 34 are both provided with apertures 39 extending therethrough and the tubes 28 are preferably detachably coupled thereto to provide communication between the water storage volumes 16 of tank 12, 38 of tank 34 and 22 of tank 18.

When it is not desired to utilize one or more apertures 39 for interconnection to another tank means through a tube means, a suitable plug may be detachably coupled to the particular aperture for water tight sealing engagement therewith. One embodiment of a detachably mounted plug is illustrated in the drawing on FIG. 5 and is discussed below in greater detail.

In the embodiment 32 shown on FIG. 2 the apertures 39 are in walls 36a and 36b that are oppositely disposed in tank 34. It will be appreciated that apertures can be provided, if desired, in any of the other walls 36 defining the storage volume 38 of the tank 34.

FIG. 3 illustrates another embodiment, generally designated 40, of the present invention. As shown in FIG. 3, which is a plan view of a plurality of tanks 42, 44, 46 and 48 in any desired spaced apart array, the tank means 42 may be cylindrical, the tank means 44 and 46 may be rectangular parallelpiped and the tank means 48 may be hyper-hemispheric in geometric shape. Tube means 50 and 52 provide a communication between the water storage volume 54 of tank means 42 and the water storage volume 56 of tank means 44. Tube means 58 provides communication between the water storage volume 56 of tank means 44 and the water storage volume 60 of tank means 46. Tube means 62 provides communication between the water storage volume 60 of tank means 46 and the water storage volume 64 of tank means 48. Tube means 66 provides communication between water storage volume 56 of tank means 44 and water storage volume 64 of tank means 48. Thus, the various tube means utilized in the embodiment 40 shown on FIG. 3 position the tanks in any predetermined array. It will be appreciated that the principles of the present invention may be utilized in any expandable tank system by providing additional tanks that may be coupled into any existing tank system through the interconnection of tube means therebetween in any desired configuration.

FIG. 4 is a sectional view illustrating one form of structural arrangement for the detachable coupling between the tube means and tank means such as tube means 28 and tank means 12 and 14 illustrated in FIG. 1. However, it will be appreciated, the same type of detachable coupling means may be utilized in any embodiment of the present invention.

Thus as shown, the tube means 28 is provided with a threaded boss 70 at each end thereof. The tube means 28 is also provided with walls 72 defining "O" ring grooves 74 therein at each end thereof.

A sleeve means or nipple 76 is coupled, for example, by bonding, or otherwise, to the aperture defining edges 24 and 26 of the tank means 12 and 14, respectively, and the sleeve means 76 is provided with a shoulder or flange means 78 that is external the tank means 12 and 18, and spaced from the outer surface of the tank means. A coupling unit 80 is provided for threading engagement with the bosses 70 on each end of the tube means 28 and coupling nut 80 has a shoulder engaging portion 82 thereon for bearing against the shoulder portions 78 of the sleeve means 76. The coupling unit 80 threading engages the tube means 28 on the bosses 70 thereof and forces the tube means 28 against the shoulder 78 of the sleeve means 76 thereby compressing an "O" ring 84 that is positioned in the "O" ring grooves 74 against the shoulder means 78 to provide the water tight sealing engagement between the tube means 12 and 18. As shown in the drawings, the tanks, tubes, nipples and nuts are of the same type of material.

FIG. 5 illustrates a plug means useful in the practice of the present invention for providing water tight sealing on one or more of the apertures in the tank means that are not utilized for interconnection to tube means. Thus, for example, the tank means 12 may be provided with the sleeve 76 bonded thereto on an aperture defining edge 24 thereof. The coupling nut 80 may also be provided for threading engagement with a boss 90 on a plug means 92. The plug means 92 is also provided with an "O" ring 94 in an "O" ring groove 96 thereof and is drawn into sealing engagement with the sleeve 76 by the coupling nut 80. When it is desired to utilize the aperture defined by aperture defining edges 24 for connection to a tube means, the plug 92 may be removed and a tube means may be threaded thereon.

In all forms of the invention, the tube means, whether straight or curved, lie entirely below the top of the tank means, and preferably below the normal water level, indicated by the broken lines in FIGS. 1 and 2 so that with the tank means open to atmosphere, gravity flow of water will fill the system.

Figure 6:
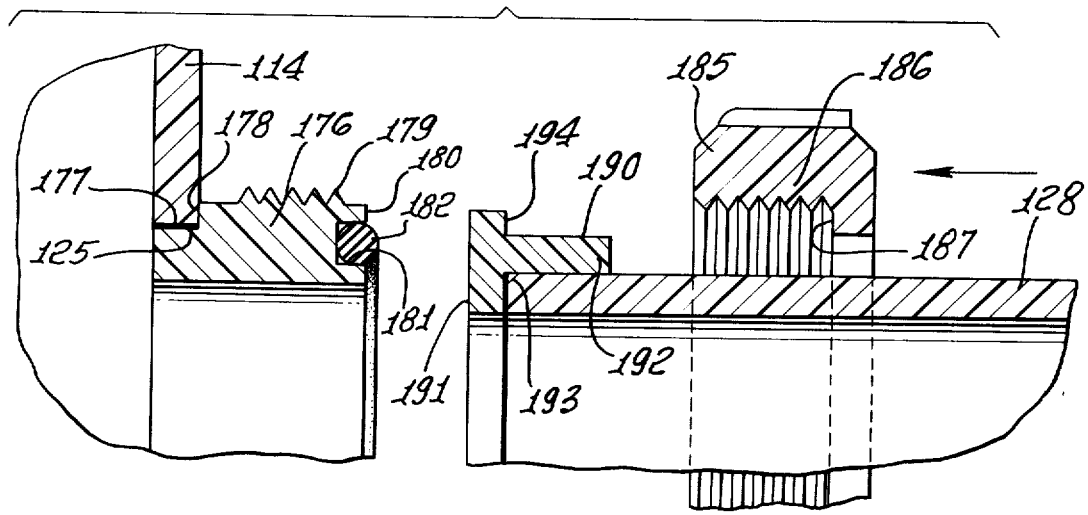
FIG. 6 is an exploded view of a second form of coupling means.
Figure 7:
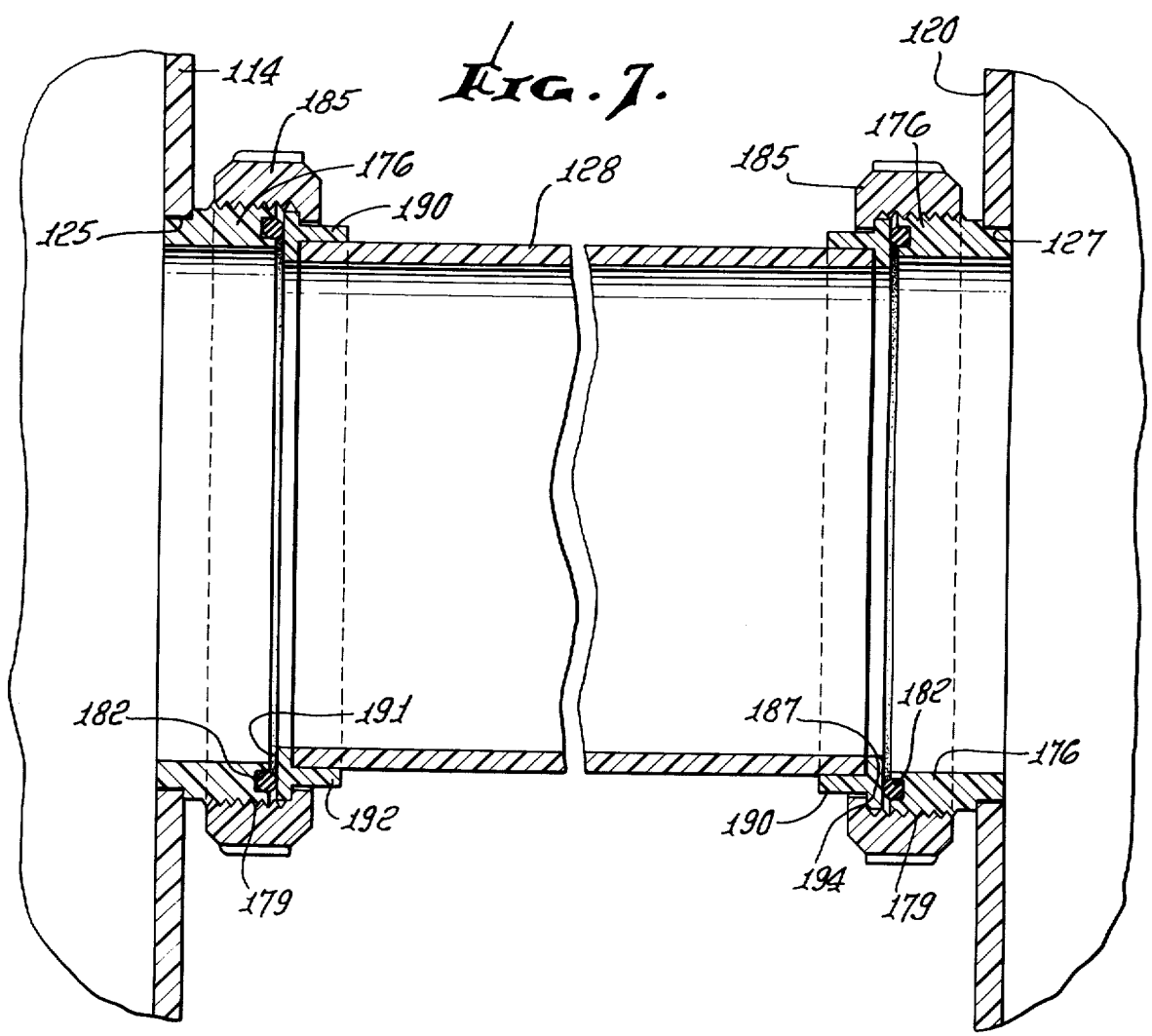
FIG. 7 is an assembled sectional view illustrating the second form of coupling means applied.

The second embodiment relates to the coupling between tanks and tubes. As illustrated in FIGS. 6 and 7, tank walls 114 and 120 are formed with apertures 125 and 127, and in each aperture is permanently bonded an annular nipple 176. This is formed with intersecting shoulders 177 and 178 which fit respectively within the aperture and against the exterior surface of the tank wall. Spaced outwardly from the tank wall the nipple is formed with an externally threaded section 179 with an annular seat 180 containing an "O" ring groove 181, receiving an "O" ring 182.

For threaded engagement with the nipple is a coupling nut 185 which is loose on the tube 128 prior to assembly. This nut has an L-shaped cross section with internal threads on the horizontal portion 186 and a flat inner surface 187 on the vertical portion, forming a radially inwardly directed annular flange.

Intermediate the nipple and the coupling nut is a sleeve 190 with a cross section resembling the letter T on its side as viewed in FIGS. 6 and 7. This provides a flange mating face 191 for contact with the "O" ring. The stem of the T forms a ring 192 which in conjunction with the head of the T provides an internal notch 193 in which the end of the tube 128 is permanently bonded. The external surface of the ring 192 in conjunction with the head of the T provides an external notch with a flange surface 194 engaged by the inner surface 187 of the coupling nut.

As shown in FIG. 7, when the nuts 185 are tightened on the nipples 176, the mating faces 191 are in sealing engagement with the "O" rings 182 in the annular seats 180.

In FIG. 8 another embodiment of the invention is shown. The tank wall 114 has an aperture 125 and fitted therein are annular outer and inner nipple forming members 198 and 205, respectively. The member 198 is permanently bonded to the tank wall at intersecting shoulders 199 and 200. It has external threads 202 and an annular mating face 203 extending axially beyond the inner member. The member 205 is generally L-shaped in cross section and has a radially outwardly directed annular flange 206 and an axially outwardly extending annular portion 207. The flange 206 has a face 209 permanently bonded to the inner surface of the tank wall 114 and the portion 207 has an outer circumferential surface 210 bonded to an inner circumferential surface of the outer member 198. The annular portion 207 has an enlarged inner circumferential surface 212 extending inwardly from its outer end, forming a shouldere 213. The latter forms an annular mating face 214.

The tube 128 extends into the inner member within the enlarged circumferential surface 212 and abuts the shoulder 213. The outer member 198 and the tube form an annular space 216, receiving an "O" ring 217. Bonded at 218 adjacent the end of the tube is a generally L-shaped flanged ring 219, having an annular ring portion 220 and having a radially outwardly directed flange portion 221. The mating face 214 is in alignment with a mating face 223 on the inner end of the ring 220. The mating face 223 is in compression with the "O" ring so as to form a seal between the tube and the two nipple members.

Fitted loosely on the tube is a coupling nut 225 having internal threads 226 in engagement with the threads 202 of the outer nipple member. The outer end of the nut has a radially inwardly directed annular flange 229 which has an inner annular face 230 in abutment with an outer annular face 231 of the flange 221. Thus, tightening of the nut moves the tube into sealed engagement with the tank wall.

Still another embodiment of the invention is shown in FIG. 9. Extending outwardly from within the tank through the aperture 125 is a nipple 235 having a generally L-shaped cross section. At the inner end of the nipple is a radially outwardly directed flange 236 spaced from the tank wall 114 by means of a ring seal 237. The nipple has external threads 240. A coupling nut 241 has internal threads 242 engaged with the threads of the nipple and in abutment with the tank wall so as to compress the seal 237 and secure the nipple to the wall 114. Axially outwardly of the nut 241 is an annular mating face 244 on the end of the nipple having an "O" ring groove 245, receiving an "O" ring 246.

On the end of the tube 128 is a T shaped sleeve 248, having an annular face 249 bonded to the outer end face 250 of the tube. At the top of the T is an annular mating face 251 in sealing engagement with the "O" ring 246.

A coupling nut 253 has internal threads 254 engaged with the external threads 240 of the nipple. Extending radially inwardly from the outer end of the nut is an annular flange 256 having an inner annular face 257 in abutment with an annular flange face 259 on the outer end of the T head. Tightening of the nut 253 couples the tube 128 into sealed relationship with the nipple 235 and the tank wall 114.

Although I have described my invention in what I have conceived to be the preferred embodiments, it is recognized that departures may be made therefrom within the scope of my invention.

I claim:

1. A modular aquarium system comprising at least two transparent tanks spaced horizontally apart in a preselected arrangement, the tanks being open adjacent the top to atmosphere; at least one transparent tube lying entirely below the upper ends of the tanks and providing communication between the tanks for gravity maintenance of water and passage of fish from one tank to the other; detachable means connecting opposite ends of the tube to the respective tanks whereby the system may be dismantled for cleaning or for modifying the arrangement, said detachable means being comprised of a nipple mounted in a wall of each tank and extending outwardly therefrom; means formed adjacent the ends of the tube for mating with the nipples; coupling members adjacent the tube ends for drawing the means adjacent each end of the tube into juxtaposition with the respective nipples; the nipples having an outer externally threaded annular member and an inner annular member, the inner member having its outer circumferential surface sealingly engaged with the inner circumferential surface of the outer member, the inner member having a radially outwardly extending flange in sealed engagement with the tank wall and with an inner end face of the outer member, an outer circumferential surface of the outer member being in sealed engagement with the tank wall, the inner member having an enlarged inner circumference at its outer end forming an annular recess for receiving a tube end, the outer end of the outer member extending axially outwardly of the outer end of the inner member so as to form an annular space between the tube and the outer member, the outer ends of the outer and the inner members having annular mating faces; the means formed adjacent the ends of the tube being flanged rings sealingly secured on the tube, each ring having an annular portion extending into said annular space and having an annular mating face in alignment with the mating face on the inner member, the ring flange extending radially outwardly from the annular portion and having one face in abutment with the mating face on the outer member; the coupling members being internally threaded nuts engaged with threads on said outer member, each nut having a radially inwardly extending flange at its outer end in abutment with a second face opposite said one face on said ring flange; and an O-ring on each tube adjacent its ends in said annular space and in sealing engagement with said mating face of said inner member and said mating face on said annular portion of said flanged ring.

2. A modular aquarium system comprising at least two transparent tanks spaced horizontally apart in a preselected arrangement, the tanks being open adjacent the top to atmosphere, at least one transparent tube lying entirely below the upper ends of the tanks and providing communication between the tanks for gravity maintenance of water and passage of fish from one tank to the other; detachable means connecting opposite ends of the tube to the respective tanks whereby the system may be dismantled for cleaning or for modifying the arrangement, said detachable means being comprised of a nipple mounted in a wall of each tank and extending outwardly therefrom; means formed adjacent the ends of the tube for mating with the nipples; coupling members adjacent the tube ends for drawing the means adjacent each end of the tube into juxtaposition with the respective nipples; the nipples each having a generally L-shaped cross section terminating in a flange spaced from the inner surface of the tank wall and presenting outward engagement annular seats; an annular seal on each nipple in the space between the tank wall and nipple flange, each nipple having external threads; a first nut having internal threads engaged with each nipple and in abutment with the tank wall and tightening the seal between the tank wall and the nipple; the means formed adjacent the ends of the tube being flanged sleeves sealingly secured thereto and having faces mating with the annular seats of the nipples; and the coupling members being second nuts threadedly engaging the threads on the nipples and bearing against portions of the flanges on the sleeves facing away from the tank.

3. A system as defined in claim 2 wherein an O-ring is interposed for sealing purposes in an annular groove in each nipple seat and in abutment with the mating face of the flanged sleeve.

4. A modular aquarium system comprising at least two transparent tanks spaced horizontally apart in a preselected arrangement, the tanks being open adjacent the top to atmosphere, at least one transparent tube lying entirely below the upper ends of the tanks and providing communication between the tanks for gravity maintenance of water and passage of fish from one tank to the other, detachable means connecting opposite ends of the tube to the respective tanks whereby the system may be dismantled for cleaning or for modifying the arrangement, said detachable means being comprised of a nipple mounted in a wall of each tank and extending outwardly therefrom, means formed adjacent the ends of the tube for mating with the nipples, coupling members adjacent the tube ends for drawing the means adjacent each end of the tube into juxtaposition with the respective nipples, each nipple having a generally L-shaped cross section terminating in a flange spaced from the outer surface of the tank wall and presenting an outward engagement face, the means formed adjacent the ends of the tube for mating with the nipples each comprising an externally threaded boss with an end face generally matching and contiguous to the engagement face of the flange, said end face having an annular groove having an O-ring therein, and the coupling members are nuts with internal threads engaging the threads on the boss and each formed with a flange disposed in the space between the outer surface of the tank and the flange of the nipple and engageable with the latter to draw the end face of the boss into juxtaposition with the face of the nipple.

5. A modular aquarium system comprising at least two transparent tanks spaced horizontally apart in a preselected arrangement, the tanks being open adjacent the top to atmosphere, at least one transparent tube lying entirely below the upper ends of the tanks and providing communication between the tanks for gravity maintenance of water and passage of fish from one tank to the other, detachable means connecting opposite ends of the tube to the respective tanks whereby the system may be dismantled for cleaning or for modifying the arrangement, said detachable means being comprised of a nipple mounted in a wall of each tank and extending outwardly therefrom, means formed adjacent the ends of the tube for mating with the nipples, coupling members adjacent the tube ends for drawing the means adjacent each end of the tube into juxtaposition with the respective nipples, each nipple being provided with external threads and annular grooved seats on their outer ends having an O-ring in each groove; the means formed adjacent the ends of the tube are T-shaped flanged sleeves sealingly secured thereto and having portions of the T-bars adjacent the T-legs in abutment with the ends of the tubes, the outer surfaces of the T-bars away from the T-legs having faces mating with the annular seats of the nipples and the O-rings; and the coupling members are nuts threadedly engaging the threads on the nipples and bearing against portions of the T-bars adjacent the T-legs.

* * * * *